United States Patent
Ueno (10) Patent No.: US 7,958,795 B2
(45) Date of Patent: Jun. 14, 2011

(54) PEDAL SYSTEM

(75) Inventor: Kentaro Ueno, Atsugi (JP)

(73) Assignee: Hitachi, Ltd., Tokyo (JP)

( * ) Notice: Subject to any disclaimer, the term of this patent is extended or adjusted under 35 U.S.C. 154(b) by 1498 days.

(21) Appl. No.: 11/355,070

(22) Filed: Feb. 16, 2006

(65) Prior Publication Data

US 2006/0219048 A1    Oct. 5, 2006

(30) Foreign Application Priority Data

Mar. 31, 2005    (JP) ................................. 2005-100364

(51) Int. Cl.
G05G 1/14    (2006.01)
(52) U.S. Cl. ................. 74/56; 74/512; 701/36; 345/161
(58) Field of Classification Search ............... 74/560, 74/512; 701/36; 345/161
See application file for complete search history.

(56) References Cited

U.S. PATENT DOCUMENTS

| | | | |
|---|---|---|---|
| 5,414,407 A * | 5/1995 | Gerrans et al. ............... | 340/475 |
| 5,999,168 A * | 12/1999 | Rosenberg et al. ........... | 345/161 |
| 6,247,381 B1 * | 6/2001 | Toelke et al. .................. | 74/512 |
| 6,295,890 B2 * | 10/2001 | Rixon et al. .................... | 74/512 |
| 6,321,617 B1 * | 11/2001 | Schwyn .......................... | 74/512 |
| 6,513,632 B2 * | 2/2003 | Peter .............................. | 188/162 |
| 6,516,683 B2 * | 2/2003 | Sundaresan et al. .......... | 74/560 |
| 6,520,045 B2 * | 2/2003 | Fukase et al. .................. | 74/512 |
| 6,553,962 B1 * | 4/2003 | Russ et al. ...................... | 123/322 |
| 6,571,660 B2 * | 6/2003 | Gmurowski et al. ........... | 74/512 |
| 6,647,328 B2 * | 11/2003 | Walker .............................. | 701/36 |
| 6,662,677 B2 * | 12/2003 | Rixon et al. ..................... | 74/512 |
| 6,701,799 B2 * | 3/2004 | Cicotte ............................ | 74/512 |
| 6,722,226 B2 * | 4/2004 | Neag et al. ...................... | 74/512 |
| 6,725,960 B1 * | 4/2004 | Schonlau ....................... | 180/271 |
| 6,763,741 B2 * | 7/2004 | Frobel et al. ................... | 74/512 |
| 6,782,775 B2 * | 8/2004 | Hayashihara ................... | 74/512 |
| 6,962,094 B2 * | 11/2005 | Porter et al. ..................... | 74/512 |
| 7,047,837 B2 * | 5/2006 | Hayashihara ................... | 74/512 |
| 7,111,524 B2 * | 9/2006 | Kiczek et al. ................... | 74/512 |
| 7,140,270 B2 * | 11/2006 | Smith et al. ..................... | 74/512 |
| 7,188,546 B2 * | 3/2007 | Olofsson ......................... | 74/513 |
| 7,191,680 B2 * | 3/2007 | Rixon et al. .................... | 74/512 |

(Continued)

FOREIGN PATENT DOCUMENTS

EP    1 253 053    10/2002

(Continued)

OTHER PUBLICATIONS

European Search Report dated Oct. 24, 2007.

*Primary Examiner* — Thomas G Black
*Assistant Examiner* — Wae Louie
(74) *Attorney, Agent, or Firm* — Crowell & Moring LLP (57) ABSTRACT

To enable a pedal system equipped with an actuator to reduce power consumption and put a pedal at an appropriate position when there is no need to operate the pedal. A system state control unit changes pedal position to an end position or original position before deactivating the pedal system. It deactivates the pedal system based on information from a pedal position detection unit, pedal state detection unit, power supply state detection unit, and vehicle motion detection unit and activates the pedal system based on information from a power supply state detection unit. It shifts pedal position toward the original position after activation of the pedal system.

14 Claims, 11 Drawing Sheets

U.S. PATENT DOCUMENTS

| | | | |
|---|---|---|---|
| 7,228,757 B2 * | 6/2007 | Peniston et al. | 74/512 |
| 7,516,683 B2 * | 4/2009 | Jasseron | 74/512 |
| 7,568,406 B2 * | 8/2009 | Booher et al. | 74/512 |
| 7,673,538 B2 * | 3/2010 | Choi | 74/512 |
| 2006/0219048 A1 * | 10/2006 | Ueno | 74/560 |

FOREIGN PATENT DOCUMENTS

| | | |
|---|---|---|
| EP | 1 481 836 | 12/2004 |
| JP | 2000-280872 A | 10/2000 |
| JP | 2002-323930 A | 11/2002 |

* cited by examiner

PEDAL SYSTEM

FILED OF THE INVENTION

The present invention relates to a pedal system capable of electrically controlling pedal position or pedal reaction force.

BACKGROUND OF THE INVENTION

A mechanism for accelerating and decelerating a vehicle during driving consists of pedal systems such as an accelerator pedal and brake pedal for use by the driver to operate the vehicle and a vehicle output system including an engine throttle and brake calipers which serve as a means of changing vehicle motion. Conventionally, the pedal systems and vehicle output system are connected mechanically, and consequently operation of the pedal systems results directly in operation of the vehicle output system. Thus, driver's actions equal vehicle behavior. However, recent advances in electronic-control technologies and by-wire technologies have made it possible to connect the pedal systems and vehicle output system via electric communications, and thereby made it possible to control the operation of the pedal systems and operation of the vehicle output system separately. By installing actuators on the pedal systems and changing pedal position and pedal reaction force according to circumstances, the by-wire technologies make it possible to enhance the safety of driving, provide various types of feel, improve drivability, and reduce driver fatigue. For example, JP-A-2002-323930 discloses a technique for reducing driver fatigue by adjusting the pedal reaction force according to circumstances.

It takes electric power to drive a pedal system equipped with an actuator. Also, an input processor is needed to control the actuator. Besides, the input processor itself consumes power. Consequently, the pedal system equipped with an actuator needs consideration to electrical conditions, which are not needed for the pedal system connected mechanically with a vehicle output system. Techniques needed for that include, for example, a technique for reducing power consumption by cutting off power when there is no need to operate the pedal system such as when the vehicle is stopped, technique for activating and deactivating the pedal system by controlling the power to the pedal system and vehicle output system, and technique for controlling the pedal position when activating and deactivating the pedal system.

SUMMARY OF THE INVENTION

An object of the present invention is to enable a pedal system equipped with an actuator to reduce power consumption and put a pedal on standby at an appropriate position when there is no need to operate the pedal.

A main feature of the present invention is to activate and deactivate the pedal system according to circumstances and control the pedal so that it will assume an appropriate position when activating and deactivating the pedal system.

The present invention provides a pedal system comprising: a pedal; an actuator; pedal system control means for electrically controlling pedal position and pedal reaction force using the actuator; and system state control means for activating and deactivating the pedal system, wherein the system state control means changes the pedal position to a predetermined stop position before deactivating the pedal system. The stop position may be an end position or original position. When the stop position corresponds to the end position, conditions for the system state control means to change the pedal position to the end position before deactivating the pedal system include at least one of conditions that a parking brake is in operation and that a shift lever is in a P range. When the stop position corresponds to the original position, conditions for the system state control means to change the pedal position to the original position before deactivating the pedal system include that the parking brake is not in operation and that the shift lever is not in the P range. On the other hand, after activating the pedal system, the system state control means changes the pedal position to a predetermined original position.

The present invention deactivates the pedal system to reduce power consumption when there is no need to operate the pedal and activates the pedal system, as required, to allow operation of the vehicle. This makes it possible to conserve battery charge when there is no need to supply power such as when the vehicle is stopped. Also, since the pedal is located at an appropriate position when the pedal system is not in operation, it is easy to get on and off the vehicle and possible to improve comfort during rest on the driver's seat.

Other objects, features and advantages of the invention will become apparent from the following description of the embodiments of the invention taken in conjunction with the accompanying drawings.

PREFERRED EMBODIMENTS OF THE INVENTION

The present invention makes it possible to activate and deactivate a pedal system and move a pedal to appropriate positions based on vehicle information. Embodiments of the present invention will be described below with reference to the drawings.

EXAMPLE 1

Figure 1:
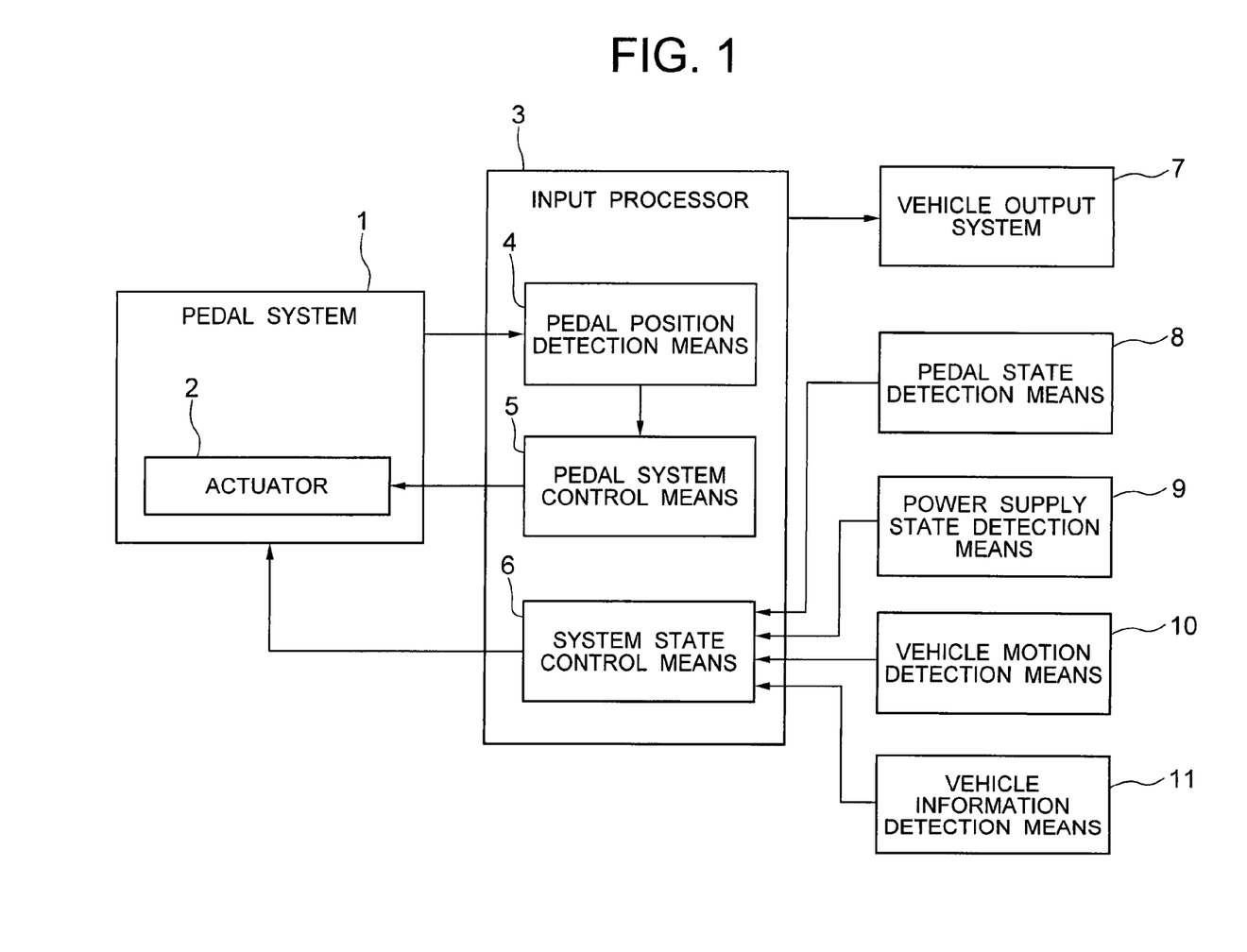
FIG. 1 is a block diagram showing a configuration of example 1.

FIG. 1 is a schematic diagram showing a system which constitutes the present invention. A pedal system 1 which is depressed by a driver's foot to operate the vehicle is equipped with an actuator 2. Pedal position and pedal reaction force of the pedal system 1 can be varied by supplying electric power to the actuator 2. An input processor 3 includes pedal position detection means 4, pedal system control means 5, and system state control means 6. The pedal position detection means 4 detects the pedal position and the pedal system control means 5 controls the actuator 2.

Pedal state detection means 8 detects whether or not the pedal is pressed and power supply state detection means 9 detects power supply state of the vehicle. Vehicle motion detection means 10 detects state of vehicle motion including vehicle speed and vehicle information detection means 11 detects state of a parking brake and state of a shift lever. A vehicle output system 7 produces vehicle outputs to change vehicle motion, based on vehicle output instructions from the input processor 3.

The system state control means 6 can activate and deactivate the pedal system 1 or input processor 3 based on information from the pedal state detection means 8, power supply state detection means 9, vehicle motion detection means 10, or vehicle information detection means 11 as well as change pedal position using the pedal system control means 5.

Figure 2:
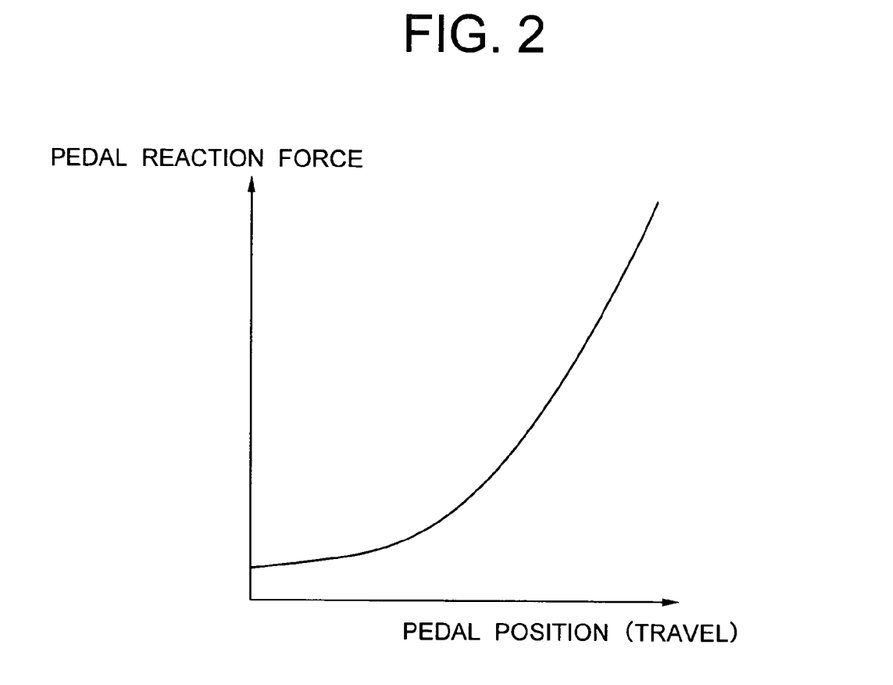
FIG. 2 is a graph used to determine pedal reaction force.

The pedal system 1, which is a user interface for use by the driver to operate the vehicle, is generally installed at the foot of the driver's seat. In response to a driver's pedal-pressing action, the pedal system 1 travels while generating an appropriate pedal reaction force. The pedal system 1 is equipped with the actuator 2 and generates the pedal reaction force electrically by software in response to a pedal effort exerted by the driver pressing the pedal. The pedal reaction force generated by the pedal system 1 has characteristics such as those shown in FIG. 2. It increases with increases in pedal travel. Relationship between the pedal reaction force and pedal position or pedal travel in FIG. 2 is controlled electrically by the actuator 2. Thus, it is not definite and may vary according to driving environment and vehicle information.

FIGS. 3 to 6 are diagrams showing configuration examples of the pedal system.

Figure 3:
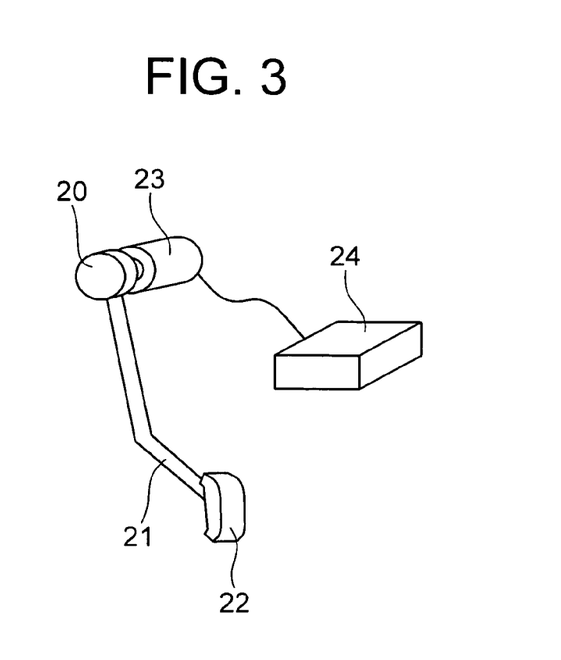
FIG. 3 is a schematic diagram showing an example of the pedal system.

The pedal system shown in FIG. 3 has a pedal input unit 22 to be pressed by the driver and a pedal arm unit 21 which converts pedal input into rotation. The pedal arm unit 21 rotates around a pedal rotation shaft 20. The pedal rotation shaft 20 is connected to an actuator 23 which corresponds to the actuator 2 shown in FIG. 1. The actuator 23 is controlled by an input processor 24. It can made the pedal arm unit 21 and pedal input unit 22 rotate around the pedal rotation shaft 20 and can generate a pedal reaction force in response to a pedal effort exerted by the driver. The input processor 24 corresponds to the input processor 3 shown in FIG. 1.

Figure 4:
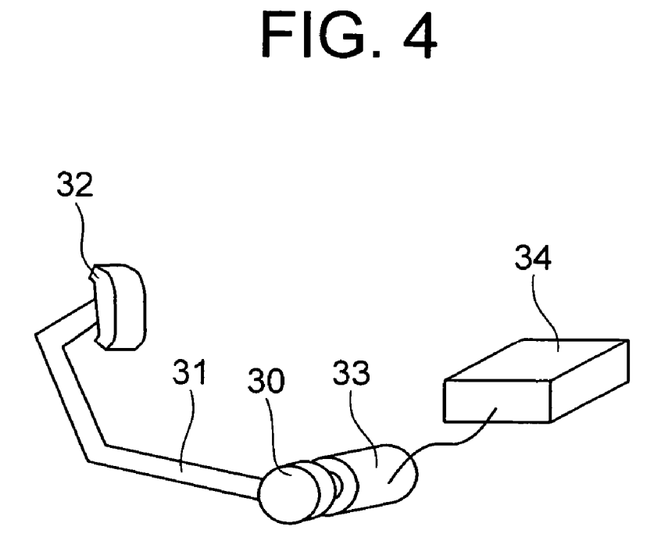
FIG. 4 is a schematic diagram showing an example of the pedal system.

In the case of the pedal system shown in FIG. 4, the pedal faces upward from a floor surface at the driver's seat. A pedal rotation shaft 30, pedal arm unit 31, and pedal input unit 32 in FIG. 4 correspond to the pedal rotation shaft 20, pedal arm unit 21, and pedal input unit 22 shown in FIG. 3, respectively. An actuator 33 corresponds to the actuator 2 shown in FIG. 1 and an input processor 34 corresponds to the input processor 3.

Figure 5:
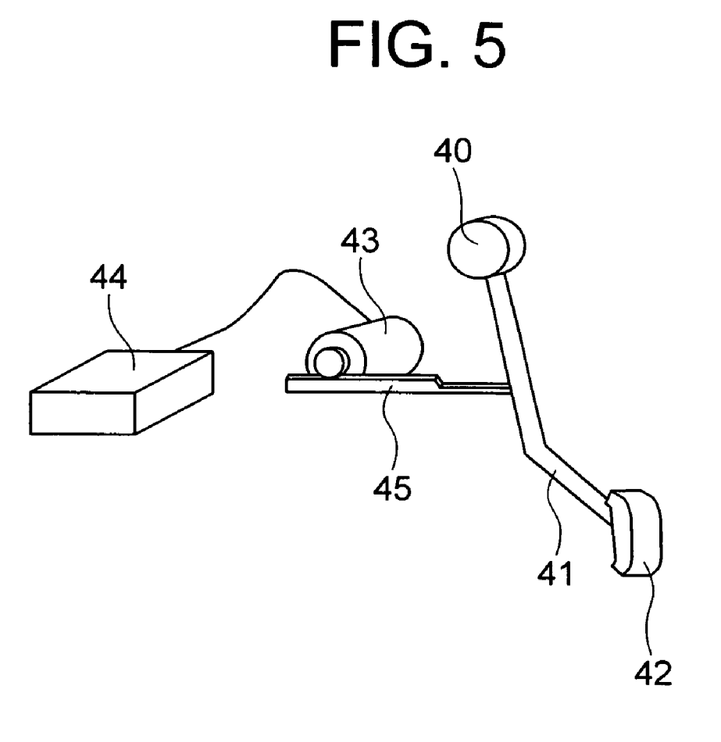
FIG. 5 is a schematic diagram showing an example of the pedal system.

The pedal system shown in FIG. 5 has a pedal rotation shaft 40, pedal arm unit 41, and pedal input unit 42. They correspond to the pedal rotation shaft 20, pedal arm unit 21, and pedal input unit 22 shown in FIG. 3, respectively. An actuator 43 corresponds to the actuator 2 shown in FIG. 1 and an input processor 44 corresponds to the input processor 3. Besides, the pedal system is equipped with a direction changer 45 which converts rotational motion of the actuator 43 to linear motion for use to push the pedal arm unit 41.

Figure 6:
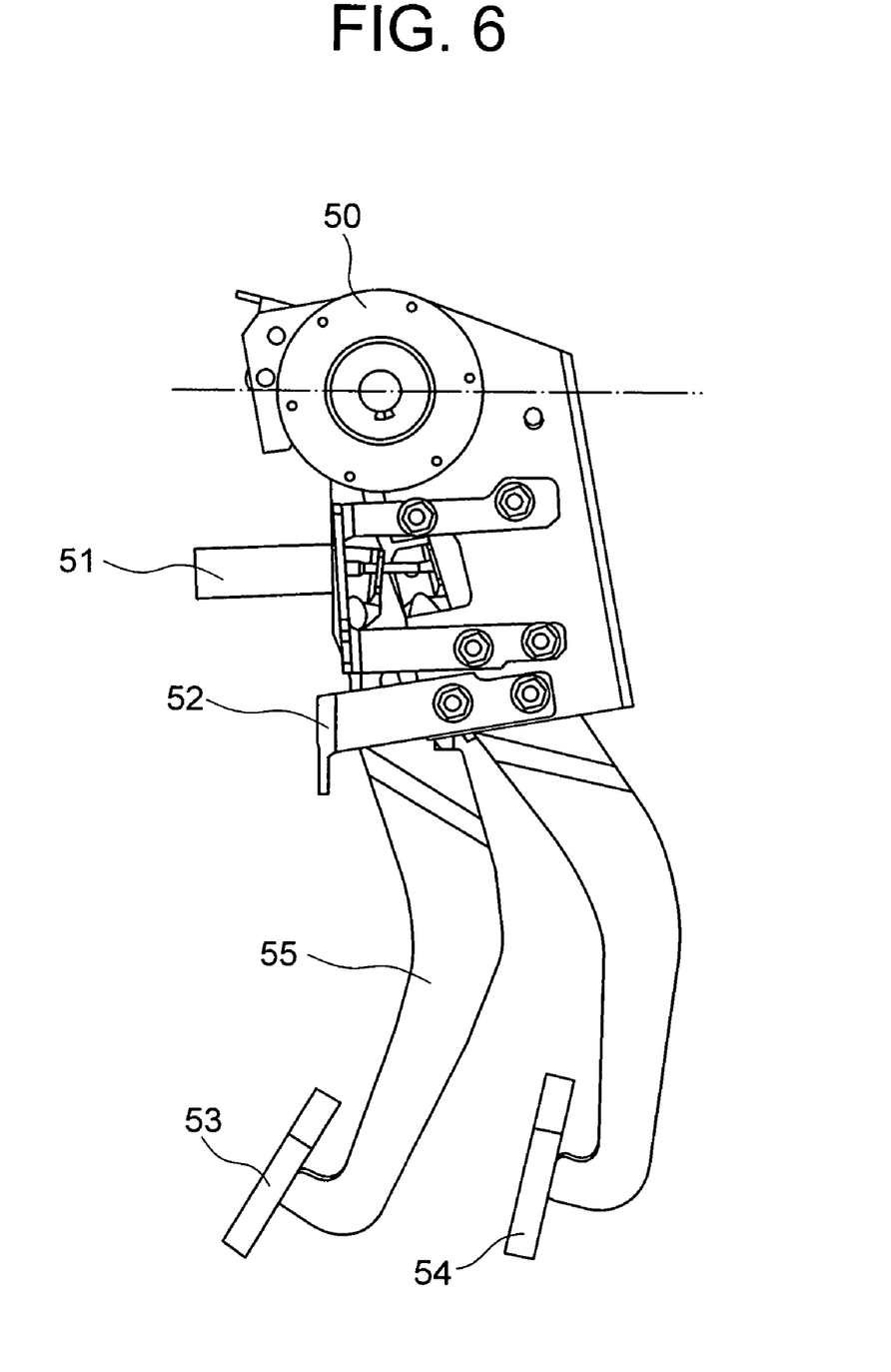
FIG. 6 is a schematic diagram showing an example of the pedal system.

Alternatively, the pedal system 1 may be configured, for example, as shown in FIG. 6. An actuator is installed on a pedal rotation shaft 50. It can move a pedal input unit from 53 to 54 or from 54 to 53. Also, a pedal travel sensor 51 is provided to measure pedal position. The input processor can control the actuator using the pedal travel sensor 51. Reference numeral 52 denotes a stopper for use to stop the pedal at a limit position when the pedal is moved toward the driver. The pedal position at which a pedal arm 55 is in contact with the stopper 52 is an original position. The stopper 52 is structured so as to be able to stop the pedal position from moving even when the actuator 2 is trying to rotate toward the driver at maximum power.

Typically, the actuators 2, 23, 33, and 43 are motors which can change the pedal position or pedal travel by passing current. The motors may be brush motors, brushless motors, or induction motors. The actuator 2 is driven by an inverter circuit provided in the input processor 3.

The pedal position detection means 4 may detect the pedal position using the pedal travel sensor 51 (shown in FIG. 6) installed in the pedal system 1 or based on information obtained by a sensor which is installed on the actuator 2 to control the actuator 2 and detect a rotation angle and phase. The sensor used to control the actuator 2 may be an encoder or resolver.

The pedal position is generally defined as the position of the part pressed by a driver's foot. A wait position at which the pedal is located when it is not pressed by the driver is defined to be 0. It is possible to define either that the pedal is located at the original position when the pedal position is 0 or that the pedal position is 0 when the pedal is located at the original position. The pedal travels when it is depressed by the driver and the pedal position which results when the pedal is fully depressed is defined to be an end position. Generally, the end position is 0.06 m to 0.1 m apart from the original position. The pedal is regarded to be moving backward when it is moving from the original position to the end position and the pedal is regarded to be moving forward when it is moving from the end position to the original position.

The pedal system control means 5 can move the pedal position and generate a pedal reaction force by controlling the actuator 2. When the vehicle is running or when the driver operates the pedal, the pedal system control means 5 generates a pedal reaction force according to the pedal position as shown in FIG. 2 or moves the pedal according to the pedal effort. Besides, the pedal system control means 5 can change the pedal position to the original position or end position when the system state control means 6 activates or deactivates the pedal system.

Figure 7:
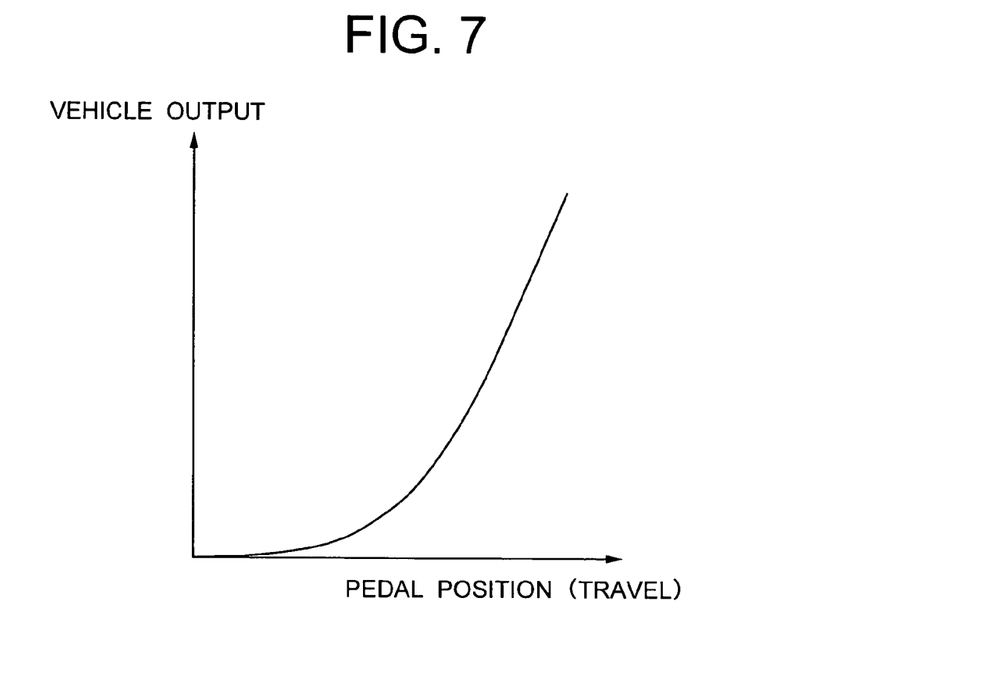
FIG. 7 is a graph used to determine vehicle output.
Figure 8:
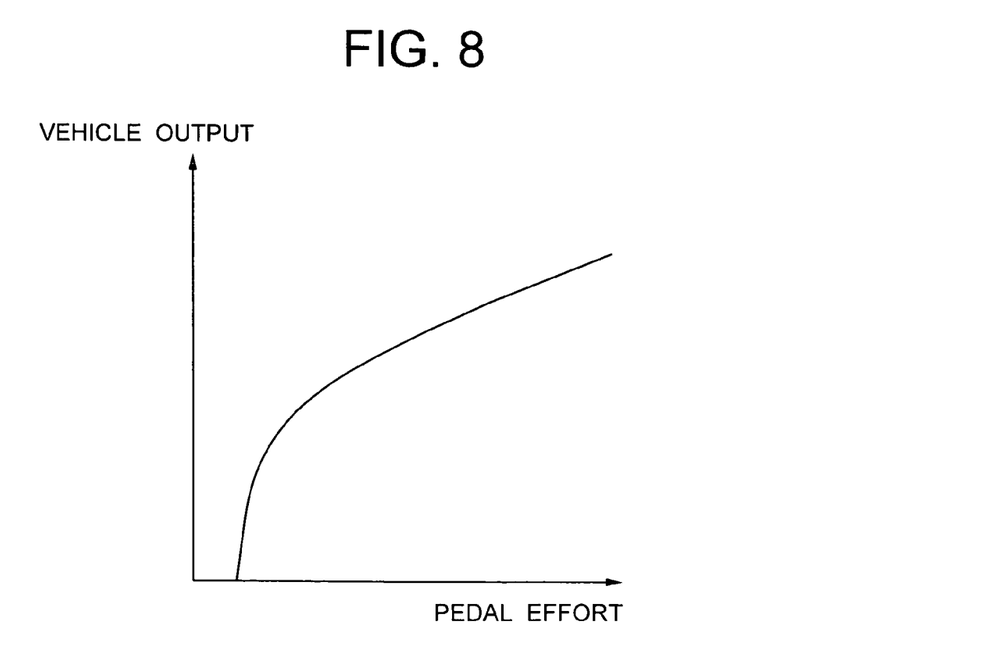
FIG. 8 is a graph used to determine vehicle output.

When the vehicle is running or when the driver operates the pedal, the vehicle output system 7 produces a vehicle output to change vehicle motion according to the pedal operation. The vehicle output may be determined based on the pedal position or pedal travel as shown in FIG. 7 or based on the pedal effort exerted to depress the pedal as shown in FIG. 8. For example, if the pedal system is a brake pedal, the vehicle output system may be an electric brake with the vehicle output being deceleration or braking force of the vehicle, or a mechanism such as an electric parking brake which continues to apply a fixed braking force to the vehicle. On the other hand, if the pedal system is an accelerator pedal, the vehicle output system may be an engine or electrically controlled throttle and the vehicle output may be vehicle acceleration or engine power. The vehicle output system 7 can fix the vehicle output to any desired value when the pedal system is activated or deactivated by the system state control means 6.

The pedal state detection means 8 detects whether the pedal is depressed. This detection may be done by means of a switch or based on the pedal effort exerted by the driver pressing the pedal. The pedal state detection means may be a brake lamp switch which turns on and off a brake lamp or a mechanism which detects whether the brake lamp is on.

The power supply state detection means 9 can detect whether a power supply system of the vehicle is energized or not. For example, an ignition switch may be used for the power supply state detection means 9. Instead of detecting the ignition switch directly, state of the engine or alternator may be detected to detect the power supply state of the vehicle.

The vehicle motion detection means 10 can detect the direction and magnitude of vehicle motion. For example, sensors which detect wheel speed may be used as the vehicle motion detection means 10. Alternatively, vehicle speed may be detected as the state of vehicle motion. Alternatively, acceleration or a yaw rate may be detected with an acceleration sensor or yaw rate sensor.

The vehicle information detection means 11 can detect conditions of the vehicle. For example, it may detect an operation switch of the parking brake or detect whether the parking brake is operating. Alternatively, it may detect shift lever position of the vehicle as a condition of the vehicle.

The system state control means 6 activates and deactivates the pedal system. Specifically, for example, it can activate and deactivate the pedal system 1 and input processor 3. Also, the system state control means 6 can change the pedal position of the pedal system 1 using the pedal system control means 5 and control the vehicle output of the vehicle output system 7.

Now, description will be given of how the system state control means 6 deactivates the pedal system.

The pedal system is used by the driver as a means of input during driving. Since the pedal system 1 and input processor 3 constantly consume power, when there is no need to operate the pedal, the power to the pedal system 1 and input processor 3 should be cut off or a sleep mode should be entered to reduce current consumption.

When deactivating the pedal system 1 and input processor 3, functions of the pedal system or both pedal system 1 and input processor 3 are stopped to minimize current consumption and power consumption. By deactivating the pedal system, it is possible to avoid abusing a power supply unit or battery of the vehicle.

When the system state control means 6 deactivates the pedal system, the pedal system 1 and input processor 3 are powered off or power themselves off. Alternatively, the current used in the system is reduced to a minimum or 0. Specifically, the current used in the system may be reduced to 0 by turning off a relay located on an electrical path leading to the battery or current consumption may be reduced to a minimum by putting a processor into a sleep mode.

Figure 9:
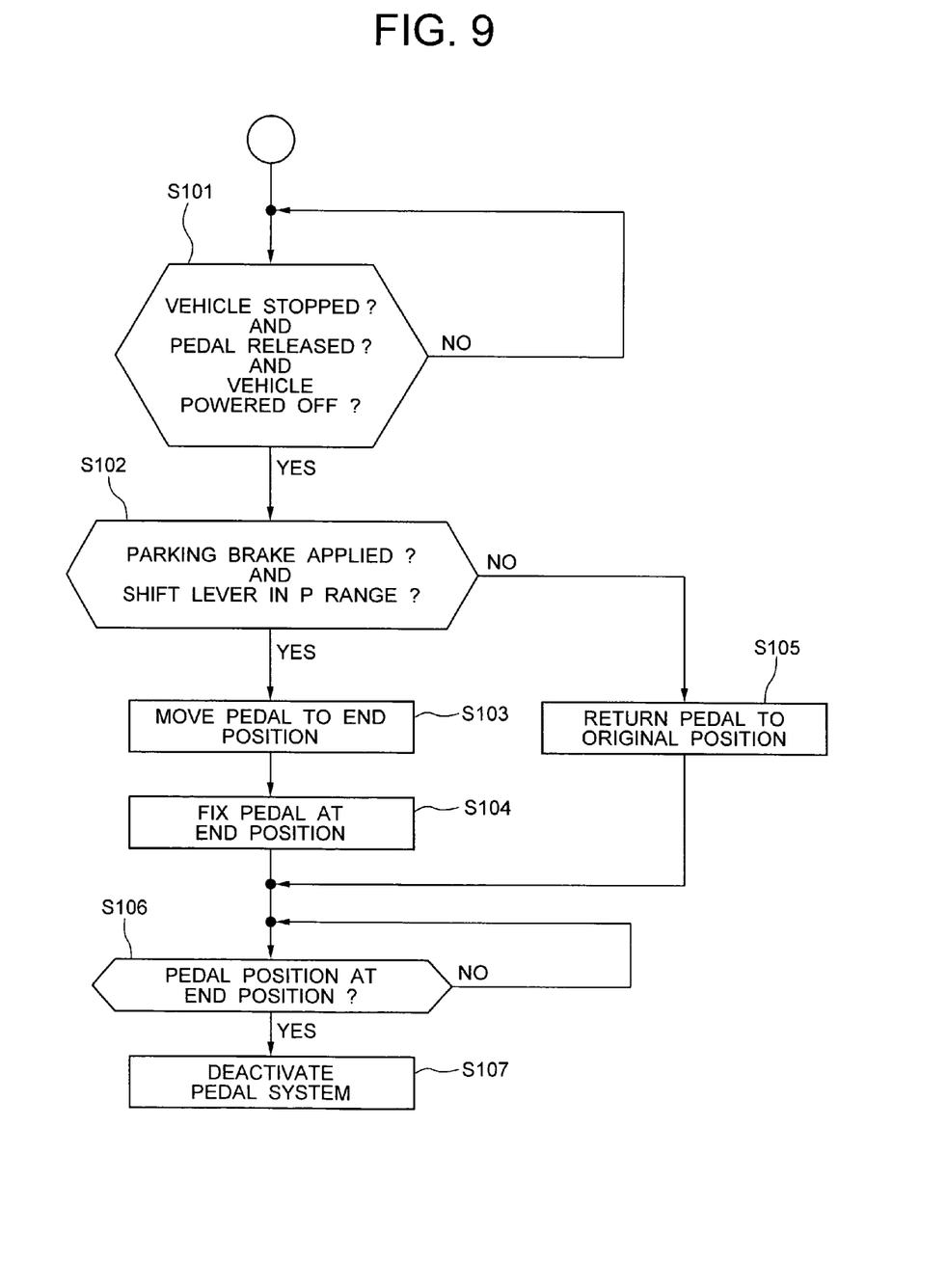
FIG. 9 is a flowchart showing an example of control performed by system state control means.

Next, description will be given of procedures for the system state control means 6 to deactivate the pedal system, with reference to FIG. 9.

Conditions for deactivating the pedal system is that there is no need to operate the pedal system and that there is almost no need to supply power to the pedal system 1 and input processor 3. That is, a necessary condition is that the vehicle is not running. If the vehicle is not running, this can be seen from the fact that the vehicle engine is not rotating or that the alternator or the like is not generating power. However, even if the engine is not rotating, the pedal system must not be deactivated halfway down a hill where it is necessary to stop the vehicle by pressing the brake pedal. Thus, conditions such as shown in Step 101 in FIG. 9 are used as conditions for deactivating the pedal system.

In Step 101, the flow goes to the next step if the following conditions are satisfied: the vehicle is stopped, the pedal is not pressed, and the vehicle is powered off. Otherwise, the flow does not go to the next step until the conditions are satisfied.

The conditions in Step 101 include that the vehicle is stopped and the determination as to whether the vehicle is stopped may be made based on the state of vehicle motion detected by the vehicle motion detection means 10. If the state of vehicle motion contains vehicle speed, it may be determined that the vehicle is stopped when the vehicle speed is 0. On the other hand, if wheel speed is detected as a state of vehicle motion, it may be determined that the vehicle is stopped when the speeds of all the wheels are 0. If the state of vehicle motion contains acceleration and a yaw rate, it may be determined that the vehicle is not stopped unless the acceleration and yaw rate are 0.

The conditions in Step 101 include that the pedal is not pressed and the determination as to whether the pedal is pressed may be made based on the pedal state detected by the pedal state detection means 8. If the pedal state contains pedal effort, it may be determined that the pedal is not depressed when the pedal effort is smaller than a predetermined value. Specifically, it may be determined that the pedal is not depressed when the pedal effort is 1 N or less. If the pedal state detection means 8 is capable of determining whether the pedal is located at the original position using a switch, it may be determined that the pedal is not depressed when the pedal is located at the original position. When determining whether the pedal is located at the original position, the switch used may be the brake lamp switch which turns on the brake lamp. When the switch is not detected directly, it may be determined that the pedal is not depressed if no voltage is applied to the brake lamp. On the other hand, it may be determined that the pedal is not depressed when the pedal travel detected by the pedal position detection means 4 is smaller than a predetermined value. Specifically, it may be determined that the pedal is not depressed when the pedal travel is 0.0002 m or less.

Furthermore, the conditions in Step 101 include that the vehicle is powered off and the determination as to whether the vehicle is powered off may be made based on the power supply state detected by the power supply state detection means 9. If the power supply state contains information about the ignition switch, it may be determined that the vehicle is powered off when the ignition switch is off. Alternatively, it may be determined that the vehicle is powered off when the power supply state detection means 9 determines that a power key of the vehicle is not inserted. Also, the state of the vehicle power supply can be determined based on the state of the engine, and thus it may be determined that the vehicle is powered off when the power supply state detection means 9 detects that the engine is stopped. Alternatively, it may be determined that the vehicle is powered off when the engine rpm is 0, output torque of the engine is 0, or generated output of the alternator is 0. Besides, it may be determined that the vehicle is powered off based on any information from a switch, sensor, or device installed on the vehicle if the information is used to turn off the vehicle power supply. For example, it may be determined that the vehicle is powered off if it is detected that the driver side door is opened once and then closed by means of a door switch or that a door lock is engaged. If the door lock is engaged by means of a radio door lock signal, it may be determined that the vehicle is powered off based on the radio signal. It is alternatively possible to check for any passenger using a seat-mounted load sensor or vehicle-mounted camera and determine that the vehicle is powered off if there is nobody on the driver's seat.

Now, description will be given of the pedal position when the pedal system is deactivated. Once the pedal system is deactivated, the pedal position cannot be changed until the pedal system is activated again. Thus, before deactivating the pedal system, the system state control means 6 changes the pedal position to a predetermined end position in Step 103 or in Step 105 in FIG. 9.

The stop position where the pedal is placed when the pedal system is deactivated can be set arbitrarily according to circumstances. For example, since the pedal system is located at the foot of the driver's seat, it may get in the way of the driver who is getting on or off the vehicle. Besides, it is more comfortable during rest in non-driving periods if there is a wide space at the foot of the driver's seat. Thus, it is possible to provide a more convenient pedal system if the pedal is retracted to the end position before deactivating the pedal system. Also, since it is not possible to operate the vehicle if the pedal position is fixed to the end position, it is possible to disable the vehicle for driving even if the engine is started in some way without going through regular procedures. This is expected to provide protection against vehicle theft. Thus, the system state control means 6 and pedal system control means 5 change the pedal position to the end position in Step 103 and fix it there in Step 104.

The conditions in Step 101 include that the vehicle is stopped. Although the vehicle is stopped, the vehicle output system is not deactivated, and may produce a vehicle output by detecting depression of the pedal. The pedal system may be configured so as to power on the vehicle when the pedal is depressed. Thus, even if the vehicle is stopped, the system state control means 6 must change the pedal position to the original position so that the driver can depress the pedal unless the vehicle is obviously intended to be kept stationary. The expression "unless the vehicle is obviously intended to be kept stationary" means cases in which the vehicle can be moved by a gradient of a road or by an external force from outside the vehicle. Specifically, such cases include, for example, a case in which the vehicle information detection means 11 detects that the parking brake is not applied and that the shift lever is not in the P range.

Unless the vehicle is obviously intended to be kept stationary, the pedal must be located at a position where the driver can operate the vehicle in case the vehicle moves against the will of the driver or passenger. For example, the pedal must be ready for operation even when the vehicle is moved intentionally by an external force such as by towing and the driver adjusts the movement through brake operation. In such cases, it is desirable that the pedal is located at the original position in order to keep the vehicle ready for operation. Thus, if is it found in Step 102 that the parking brake is applied or that the shift lever is in the P range, the system state control means 6 goes to Step 103, where it changes the pedal position to the end position. If the conditions in Step 102 are not satisfied, the system state control means 6 goes to Step 105, where it changes the pedal position to the original position.

After fixing the pedal position to the end position in Step 104 or returning the pedal position to the original position in Step 105, the system state control means 6 goes to Step 106. After confirming in Step 106 that the pedal position is changed to the end position, the system state control means 6 goes to Step 107, where it deactivates the pedal system. The stop position in Step 106 corresponds to the end position if the decision in Step 102 is Yes, or the original position if the decision in Step 102 is No.

Figure 10:
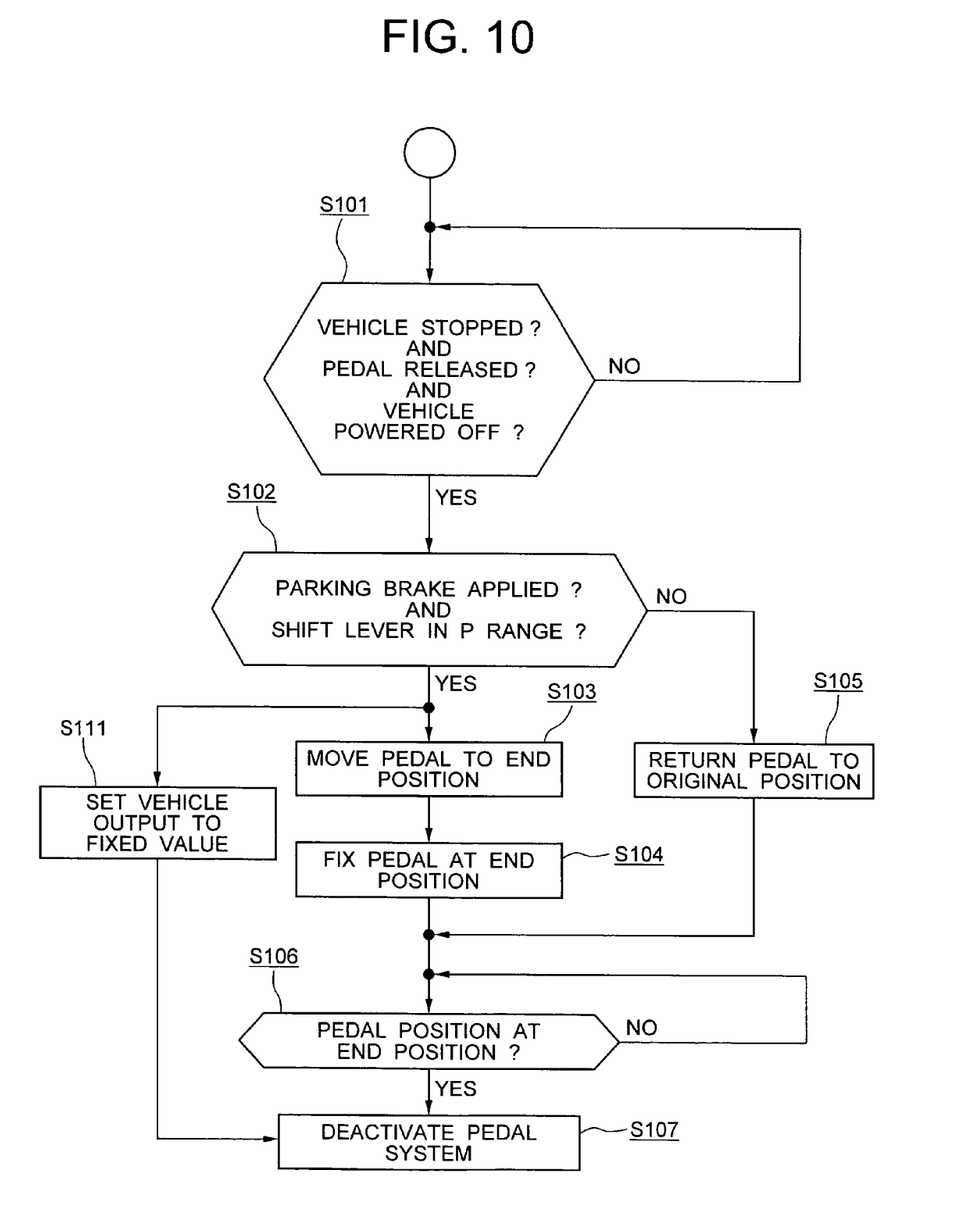
FIG. 10 is a flowchart showing an example of control performed by system state control means.

The system state control means 6 may vary the vehicle output using the vehicle output system 7. During normal driving and during the use of the pedal system, the vehicle output system 7 produces vehicle output to operate the vehicle output according to the pedal position or according to the pedal effort needed to depress the pedal. When retracting the pedal to the end position in Step 103 and Step 104, for example, as shown in FIG. 10, the vehicle output may be fixed to a predetermined value as in Step 111. If the pedal system is an accelerator pedal, the vehicle output is fixed to 0. If the pedal system is a brake pedal, the vehicle output is fixed to such a degree that the vehicle will not be moved by an external force. This can be achieved by latching calipers by application of a predetermined thrust or restraining movements of wheels using an electric parking brake. On the other hand, if the vehicle is kept stationary without using the vehicle output system, the vehicle output in Step 111 may be fixed to 0. For example, if a mechanical parking brake is in operation, the vehicle output can be fixed to 0.

Now, description will be given of how the system state control means 6 activates the pedal system. The activation of the pedal system involves supplying power to the pedal system 1 and input processor 3, thereby making the pedal system ready to move the pedal position while generating an appropriate pedal reaction force as shown in FIG. 2 when the driver depresses the pedal. The system state control means 6 activates the pedal system when the need for the driver to operate the vehicle is recognized.

To activate the pedal system, the system state control means 6 passes electric current through the pedal system 1 and input processor 3 or outputs a signal specifying passage of electric current. Upon the passage of electric current or reception of the signal for passage of electric current, the pedal system and input processor activate the pedal system so that it will operate properly. Specifically, for example, electric current may be passed through a relay installed in an electric system connected to a battery, or the input processor, which is in sleep mode, may be put into normal mode. Possible conditions for powering on the pedal system 1 and input processor 3 include, for example, a condition that the vehicle is powered on, as in Step 121 in FIG. 11. The determination as to whether the vehicle is powered on may be made based on the power supply state detected by the power supply state detection means 9. For example, it may be determined that the vehicle is powered on when the ignition switch is on. Alternatively, it may be determined that the vehicle is powered on when the engine is operating and the engine rpm, output torque of the engine, or generated output of the alternator is not 0. Besides, it may be determined that the vehicle is powered on based on any information from a switch, sensor, or device installed on the vehicle if the information is used to turn on the vehicle power supply. For example, it may be determined that the vehicle is powered on if it is detected that the driver side door is opened by means of a door switch or that a door lock is opened. If a door lock is opened by means of a radio door lock signal, it may be determined that the vehicle is powered on based on the radio signal. It is alternatively possible to check for any passenger using a seat-mounted load sensor or vehicle-mounted camera and determine that the vehicle is powered on if there is someone on the driver's seat. It may be determined that the vehicle is powered on if the pedal is pressed, the steering wheel is operated, or the shift lever is operated. If the conditions in Step 121 are satisfied, the system state control means 6 activates the pedal system in Step 122.

Figure 11:
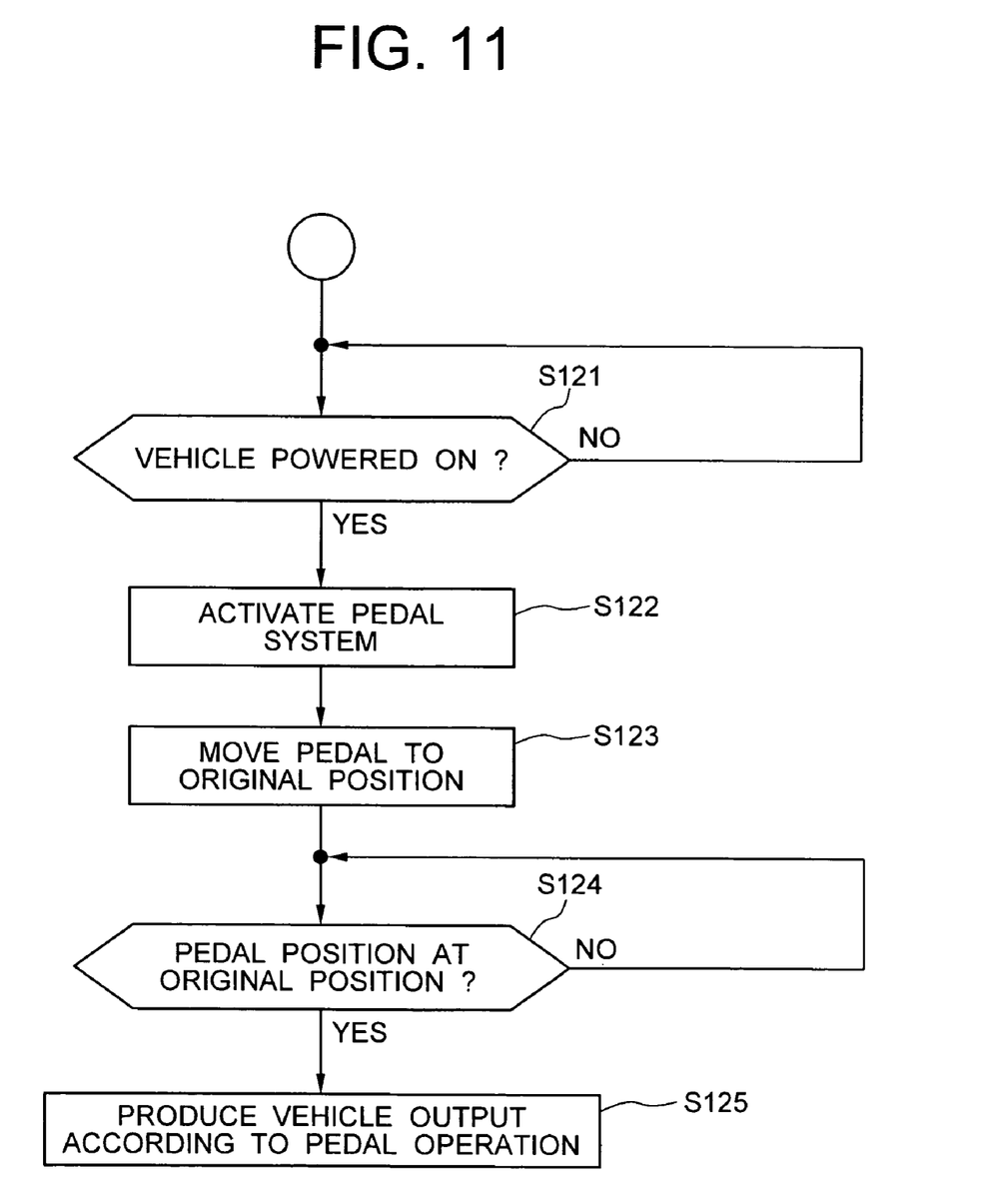
FIG. 11 is a flowchart showing an example of control performed by system state control means.

After the pedal system is deactivated, if the power to the pedal system 1 or input processor 3 is cut off or if the system is in sleep mode, since the pedal system control means does not control the pedal system, the pedal position does not necessarily correspond to the original position immediately after the power is turned on or the sleep mode is exited. In order for the driver to operate the vehicle, the pedal position must be at the original position, and thus the system state control means 6 changes the pedal position to the original position after activating the pedal system. Desirably the pedal position is moved somewhat slowly to prevent the pedal from suddenly hitting the driver's foot. Specifically, the pedal input unit is moved at 0.1 to 0.2 m/s. The system state control means 6 changes the pedal position to the original position in Step 123 and confirms in Step 124 that the pedal position is changed to the original position. In Step 125, it ensures that vehicle output will be produced according to the pedal position and pedal effort resulting from pedal depression by the driver. The vehicle output is set to a fixed value regardless of the state of the pedal system until the decision in Step 124 becomes Yes.

Next, description will be given of a case in which the pedal position cannot be measured accurately immediately after activation of the pedal system.

The sensors which measure the pedal position and components which compose the pedal may be subject to temperature changes and secular changes, resulting in deviations in a reference for measurement of the pedal position. The pedal position is measured from the rotation angle of the actuator 2 and if an encoder or resolver is used as a sensor, the pedal position is measured as a relative position. Then, it may not be possible to measure the absolute position of the pedal immediately after activation of the pedal system. To deal with this situation, the system state control means 6 may shift the original position of the pedal forward using a control flow such as shown in FIG. 12.

Figure 12:
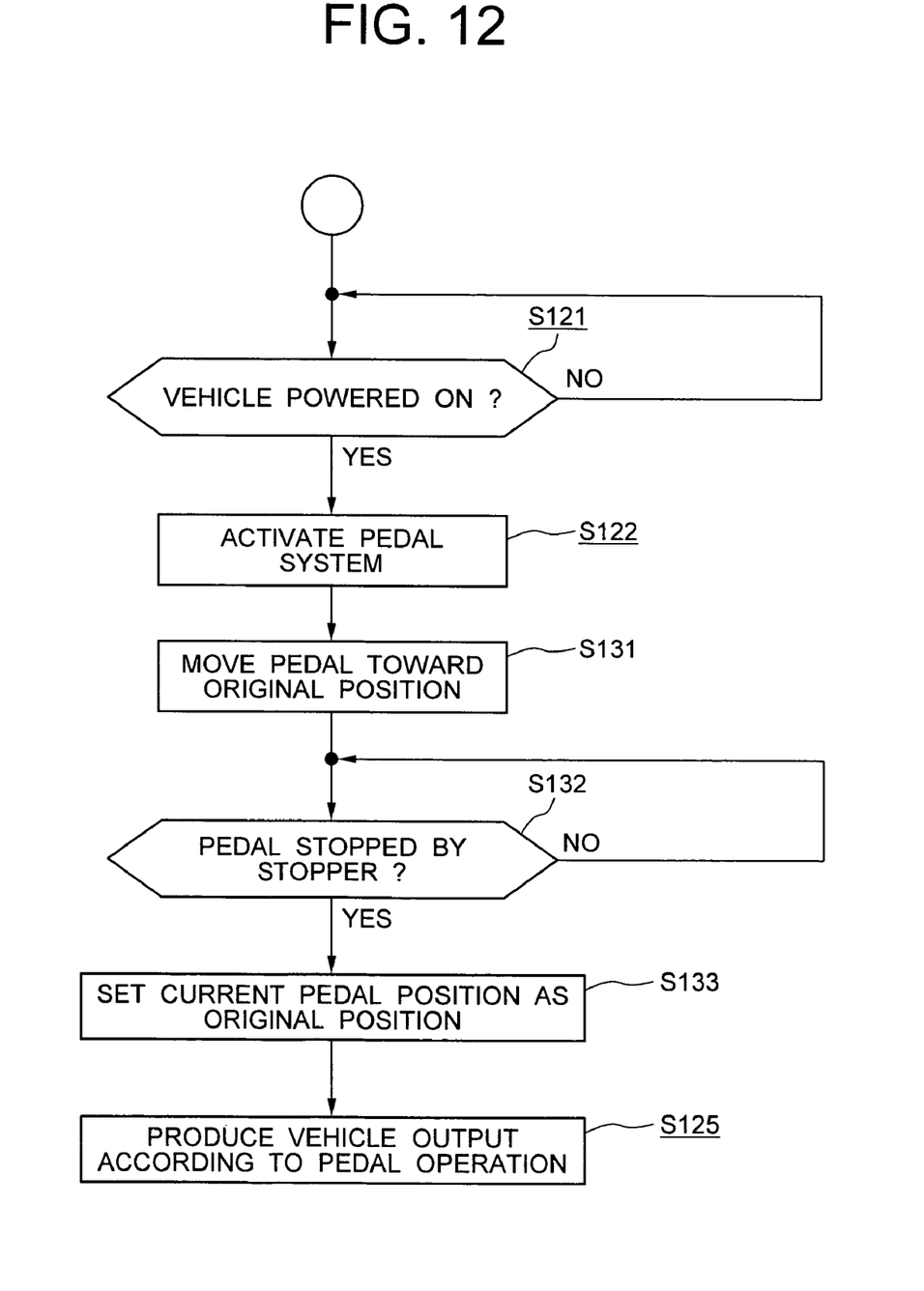
FIG. 12 is a flowchart showing an example of control performed by system state control means.

Even if the pedal position cannot be measured, a relative change of the pedal position, i.e., pedal velocity can be measured, and thus the pedal can be moved forward, i.e., toward the original position, for example, as shown in Step 131 in FIG. 12. After the forward movement, the pedal is stopped by the stopper 52 such as shown in FIG. 6. Since the pedal does not move further forward than the stopper, the system state control means 6 determines in Step 132 whether the pedal is stopped by the stopper, and if the pedal is stopped by the stopper, the current pedal position is set as the original position in Step 133. By establishing the original position in Step 133, it is possible to measure the pedal position accurately. If it is found in Step 132 that the pedal is not pressed and if the pedal position does not change even if the pedal system control means 5 tries to move the pedal with a force larger than a predetermined force, it may be determined that the pedal is in contact with the stopper at the original position and is stopped by the stopper. The determination as to whether the pedal system control means 5 is trying to move the pedal with a force larger than a predetermined force can be made based on whether the pedal system control means 5 is passing a current larger than a predetermined threshold through the actuator 2 in the return direction of the pedal.

Thus, as the system state control means 6 activates and deactivates the pedal system, it is possible to reduce power supply to the pedal system when the pedal system is not in use. Also, by moving the pedal position when deactivating the pedal system, it is possible to increase the space at the foot of the driver's seat as required, increasing the convenience of getting on and off the vehicle and ensuring comfort during rest. Furthermore, by returning the pedal position to the original position upon activation of the pedal system, it is possible to resume normal operating position when the vehicle is driven even if the pedal system moves to a pedal position other than the original position during a period between deactivation and activation of the pedal system. This makes it possible to drive the vehicle more comfortably than conventional vehicles.

EXAMPLE 2

Next, an example of application of the present invention will be described. According to example 1, the end position is used as the stop position at which the pedal is kept waiting when the power supply to the pedal system is reduced. The end position is defined to be the farthest position the pedal can move to when depressed farthest by a driver's foot. The end position for the pedal system of the present invention is not limited to this definition.

Figure 13:
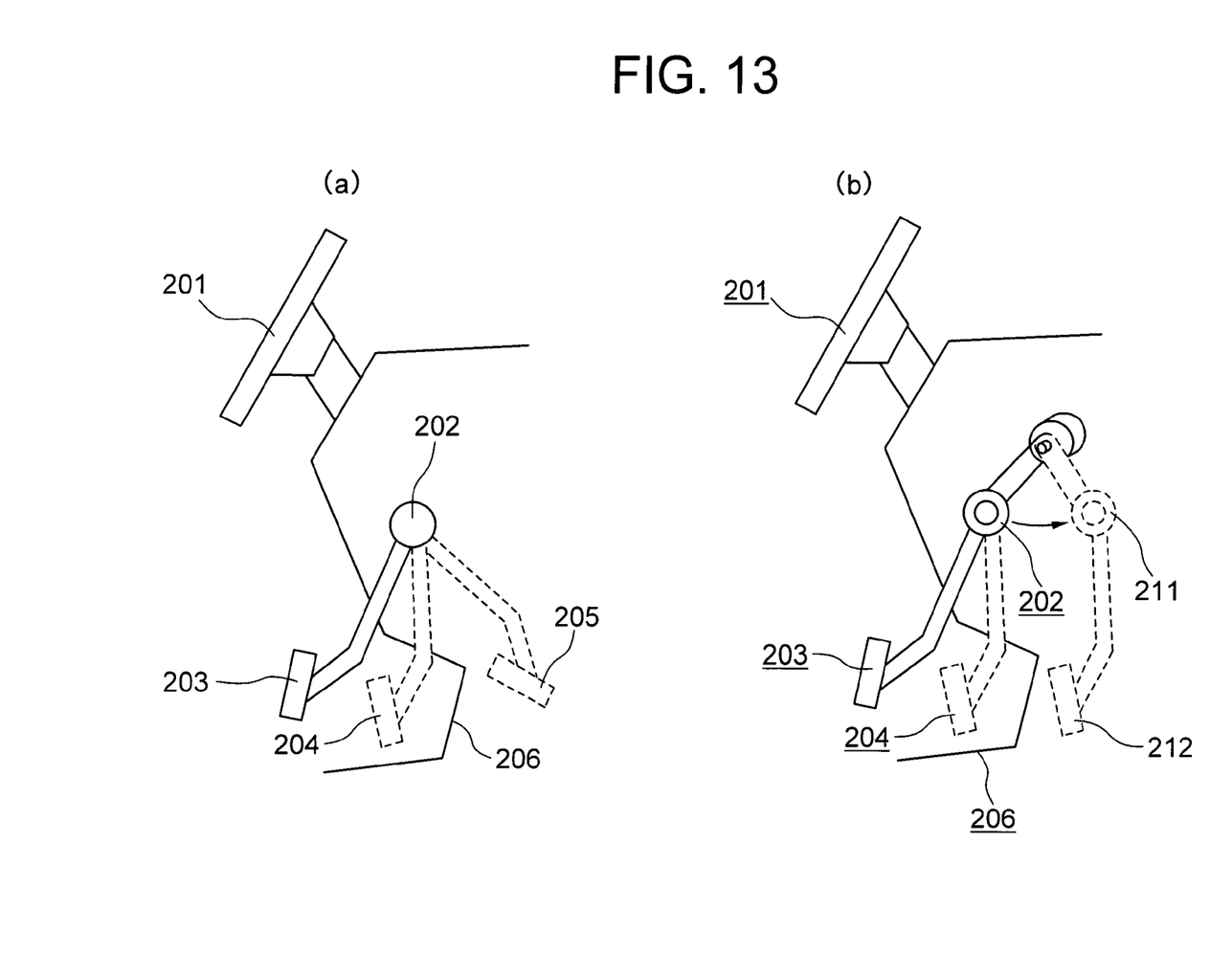
FIG. 13 is a schematic diagram showing a configuration of example 2.

For example, in a pedal system such as shown in FIG. 13A, if reference numeral 203 denotes the original position which is the pedal position where the pedal is located when it is not pressed by the driver during normal driving and reference numeral 204 denotes the end position which is the farthest position the pedal can travel to when it is depressed by the driver, the stop position where the pedal is kept waiting when the power supply to the pedal system is reduced may be defined to be farther than the pedal position which the pedal can move to when it is pressed by the driver during normal driving, as indicated by reference numeral 205. In example 1, the pedal waits in the cabin at a location nearer to the driver than a wall surface 206 at the foot of the driver's seat, and if the driver moves his/her leg greatly at the foot of the driver's seat, the lower leg may be hit by the pedal. However, if the pedal is made to wait beyond the wall surface 206 as shown in FIG. 13A, the driver can move his/her legs freely within its range of movement at the foot of the driver's seat. By setting the end position as shown in FIG. 13A, it is possible to further improve the convenience of getting on and off the vehicle and comfort during rest.

In FIG. 13A, if the range of movement around a rotation shaft 202 is limited, making it impossible to move the pedal to 205, the end position may be set as shown in FIG. 13B. In FIG. 13B, a travel mechanism moves the rotation shaft 202 to 211 together with the pedal. The pedal may be moved directly sideward, obliquely upward, or obliquely downward. Since the end position moves to 212 when the rotation shaft moves to 211, the pedal can be moved beyond the wall surface 206 regardless of a rotation area around the rotation shaft. The pedal can also be moved beyond the wall surface 206 by a combination of the pedal movement around the rotation shaft shown in FIG. 13A and movement of the rotation shaft itself shown in FIG. 13B.

Figure 14:
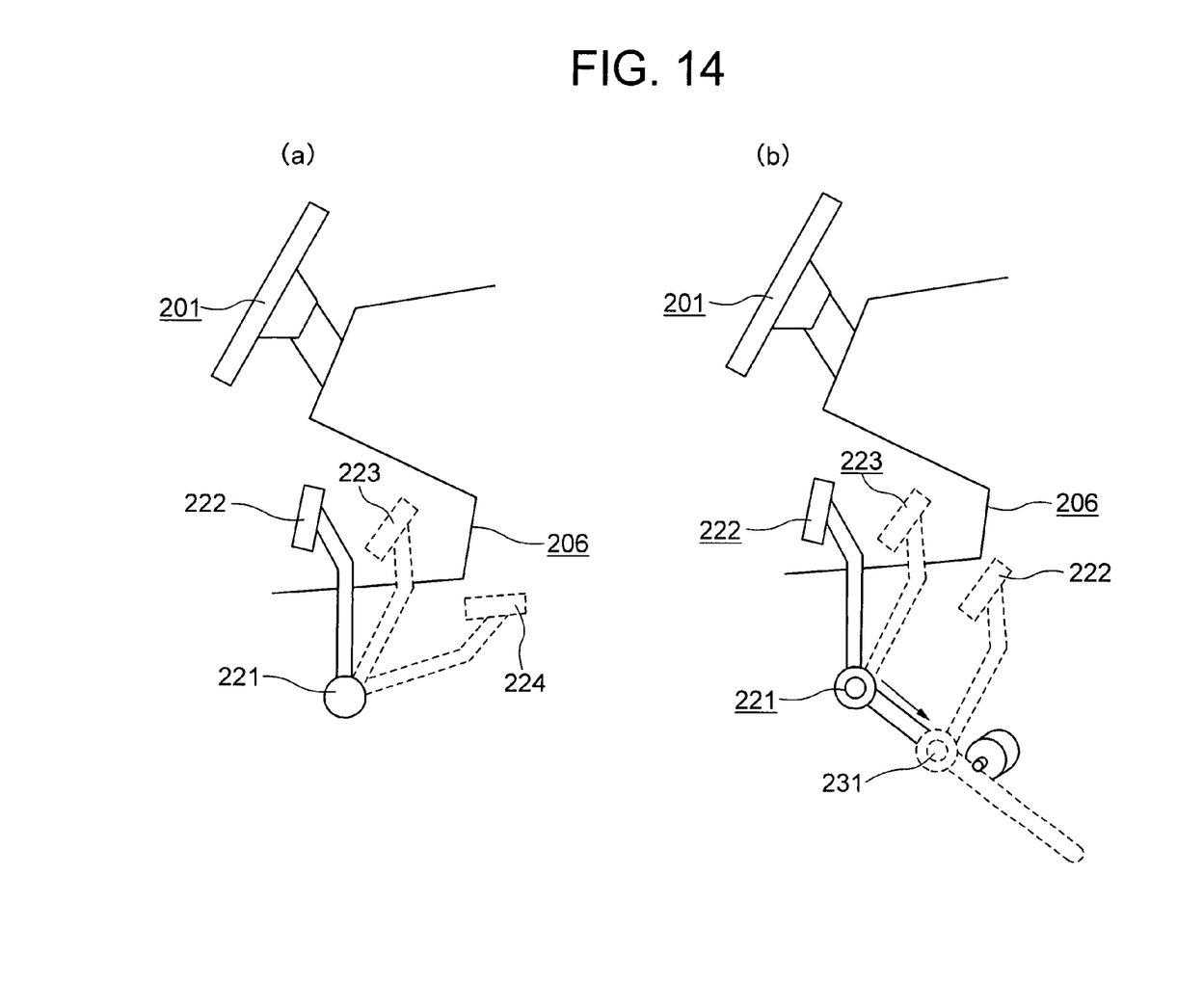
FIG. 14 is a schematic diagram showing a configuration of example 2.

The same can be applied to a pedal system in which the point of application or power point of the pedal is located above the fulcrum as shown in FIG. 14. For example, in FIG. 14A, if the original position is located at 222, the end position may be set at 224 although according to example 1, the end position is located at 223. In FIG. 14B, as the a rotation shaft 221 of the pedal is moved to 231 by a travel mechanism, the pedal is moved beyond or below the wall surface 206, and the end position may be set at 232. The movement from 221 to 231 may be directed directly downward, obliquely forward, or obliquely backward. The pedal can also be moved beyond the wall surface 206 by a combination of the pedal movement around the rotation shaft shown in FIG. 14A and movement of the rotation shaft itself shown in FIG. 14B.

The present invention makes it possible to implement the pedal system which controls pedal position or pedal reaction force using electrical force, where the pedal system can activate and deactivate the pedal system by determining whether it is necessary to operate the pedal system, adjust the power consumption of the pedal system as required, and change the pedal position to an appropriate position as required when activating and deactivating the pedal system.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A pedal system comprising:
   a pedal;
   an actuator;
   pedal system control means for electrically controlling pedal position and pedal reaction force using the actuator;
   system state control means for activating and deactivating the pedal system; and
   a stopper for preventing the pedal position from moving further forward than the original position, wherein
   the system state control means changes the pedal position to a predetermined original position before deactivating the pedal system,
   after activating the pedal system, the system state control means moves the pedal position forward until the movement is stopped by the stopper, and
   the pedal position at which the movement is stopped by the stopper is the original position.

2. The pedal system according to claim 1, wherein the predetermined original position is a predetermined stop position.

3. The pedal system according to claim 2, wherein conditions for the system state control means to deactivate the pedal system include that the pedal position is changed to the predetermined stop position.

4. The pedal system according to claim 2, wherein the stop position corresponds to an end position.

5. The pedal system according to claim 4, comprising:
   vehicle information detection means for detecting state of a parking brake and state of a shift lever, wherein
   conditions for the system state control means to change the pedal position to the end position before deactivating the pedal system include at least one of conditions that a parking brake is in operation and that the shift lever is in a P range.

6. The pedal system according to claim 2, wherein the stop position corresponds to a predetermined original position.

7. The pedal system according to claim 6, comprising:
   vehicle information detection means for detecting state of a parking brake and state of a shift lever, wherein
   conditions for the system state control means to change the pedal position to the original position before deactivating the pedal system include that the parking brake is not in operation and that the shift lever is not in a P range.

8. The pedal system according to claim 2, comprising:
   pedal state detection means for detecting whether or not the pedal is pressed, wherein
   conditions for the system state control means to deactivate the pedal system include that the pedal is not pressed.

9. The pedal system according to claim 2, comprising:
   vehicle motion detection means for detecting operating state of vehicle motion, wherein
   conditions for the system state control means to deactivate the pedal system include that the vehicle is stopped.

10. The pedal system according to claim 2, comprising:
    power supply state detection means for detecting power supply state of the vehicle, wherein
    conditions for the system state control means to deactivate the pedal system include that the vehicle is powered off.

11. The pedal system according to claim 2, wherein the pedal is a brake pedal or an accelerator pedal.

12. The pedal system according to claim 1, wherein when the pedal is not pressed and a force moving the pedal toward the stopper is larger than a predetermined threshold, it is determined that the movement of the pedal is stopped by the stopper and the pedal position at that time is regarded to be the original position.

13. The pedal system according to claim 1, wherein when the pedal is not pressed and a current moving the pedal toward the stopper is larger than a predetermined threshold, it is determined that the movement of the pedal is stopped by the stopper and the pedal position at that time is regarded to be the original position.

14. The pedal system according to claim 1, wherein conditions for the system state control means to activate the pedal system include that the vehicle is powered on.

* * * * *